(12) United States Patent
Maeda et al.

(10) Patent No.: US 7,854,516 B2
(45) Date of Patent: Dec. 21, 2010

(54) ILLUMINATION APPARATUS THAT USES FOUR COLOR COMPONENT LIGHT AND A PROJECTION DISPLAY APPARATUS

(75) Inventors: Makoto Maeda, Osaka (JP); Takaaki Abe, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 442 days.

(21) Appl. No.: 12/105,321

(22) Filed: Apr. 18, 2008

(65) Prior Publication Data
US 2008/0259283 A1    Oct. 23, 2008

(30) Foreign Application Priority Data
Apr. 19, 2007    (JP) .............................. 2007-110923

(51) Int. Cl.
*G03B 21/00*    (2006.01)
*G03B 21/14*    (2006.01)
(52) U.S. Cl. .......................................... 353/31; 353/20
(58) Field of Classification Search ................... 353/20, 353/30–33, 81, 84; 359/247, 251, 238–242, 359/629, 634, 639, 640; 250/216, 225, 226, 250/229, 208.1; 348/335–339, 758, 790, 348/791; 349/5, 7–9
See application file for complete search history.

(56) References Cited

U.S. PATENT DOCUMENTS

| 6,704,065 B1 * | 3/2004 | Sharp et al. ..................... 349/5 |
| 6,819,365 B1 * | 11/2004 | Peng .............................. 349/9 |
| 2005/0073655 A1 * | 4/2005 | Berman ....................... 353/33 |
| 2006/0197914 A1 * | 9/2006 | Robinson ..................... 353/20 |

FOREIGN PATENT DOCUMENTS

JP    2002-287247 A1    10/2002

* cited by examiner

*Primary Examiner*—Que T Le
*Assistant Examiner*—Jennifer Bennett
(74) *Attorney, Agent, or Firm*—Marvin A. Motsenbocker; Mots Law, PLLC

(57) ABSTRACT

An illumination apparatus includes: a first dichroic mirror; a second dichroic mirror which separates the combined light into a red component light R and the green component light G; and a polarization adjuster provided on an optical path of the combined light between the dichroic mirrors. The polarization adjuster adjusts a polarization direction of a yellow component light Ye in the combined light. A second dichroic mirror separates the combined light into the red component light R on which a part of or all of the yellow component light Ye is superimposed and the green component light G on which the rest of the yellow component light Ye is superimposed.

8 Claims, 11 Drawing Sheets

| ADJUSTMENT RATE OF POLARIZATION ADJUSTER (%) | | G PANEL (/100) | | R PANEL (/100) | | Ye LIGHT DISTRIBUTION STATE |
|---|---|---|---|---|---|---|
| 31Ye | 32Ye | G | Ye | Ye | R | |
| 0 | 0 | 100 | 100 | 0 | 100 | GYe |
| 0 | 50 | 100 | 50 | 0 | 100 | GYe |
| 0 | 100 | 100 | 0 | 0 | 100 | OFF |
| 50 | 0 | 100 | 50 | 50 | 100 | GYeR |
| 50 | 50 | 100 | 25 | 50 | 100 | GYeR |
| 50 | 100 | 100 | 0 | 50 | 100 | YeR |
| 100 | 0 | 100 | 0 | 100 | 100 | YeR |
| 100 | 50 | 100 | 0 | 100 | 100 | YeR |
| 100 | 100 | 100 | 0 | 100 | 100 | YeR |

ILLUMINATION APPARATUS THAT USES FOUR COLOR COMPONENT LIGHT AND A PROJECTION DISPLAY APPARATUS

BACKGROUND OF THE INVENTION

1. Field of the Invention

The present invention relates to an illumination apparatus and a projection display apparatus, both of which utilize four kinds or more of color component lights.

2. Description of the Related Art

Conventionally, there has been known a projection display apparatus having: three imagers corresponding to three kinds of color component lights; a cross dichroic cube which combines the color component lights emitted from the three imagers; and a projection lens unit which projects the color component light combined by the cross dichroic cube.

Here, the cross dichroic cube has three light incident surfaces onto which the color component lights enter and one light emitting surface from which the color component lights are emitted. Therefore, when there are three kinds of color component lights entering the cross dichroic cube, the projection display apparatus needs to only have one cross dichroic cube as a color combiner.

Meanwhile, there has been proposed a projection display apparatus which utilizes four kinds or more of lights for the purpose of improving color reproducibility and luminance. For example, the projection display apparatus achieves improvement in the color reproducibility and the luminance by utilizing orange, yellow or cyan in addition to three colors of red, green and blue (see, for example, claims 1 and 4, as well as, FIG. 1 and the like in Japanese Patent Application Publication No. 2002-287247).

Here, in the case where the projection display apparatus utilizes four kinds or more of color component lights, the four kinds or more of color component lights cannot be combined by one color combiner (cross dichroic cube). Therefore, the projection display apparatus is required to have a plurality of color combiners (dichroic cubes or cross dichroic cubes).

For example, when it is required to combine four kinds of color component lights, the projection display apparatus obtains a combined light including the four kinds of color component lights, by obtaining two combined lights each including two kinds of color component lights, and by further combining the two combined lights. Note that the projection display apparatus may alternatively obtain a combined light including the four kinds of color component lights, by obtaining a combined light including three kinds of color component lights and, by further combining the combined light with one color component light. Moreover, the projection display apparatus may also obtain a combined light including the four kinds of color component lights, by obtaining a combined light including two kinds of color component lights, and by further combining the combined light with two kinds of color component lights.

Here, optical path length from each of imagers corresponding to the four kinds or more of color component lights to the projection lens unit is required to be the same. Moreover, it is required to provide a plurality of color combiners (dichroic cubes or cross dichroic cubes) between the imagers and the projection lens unit. Therefore, a back-focus of the projection lens unit is increased.

As a result, it is impossible to divert the projection lens unit used in the projection display apparatus which utilizes three kinds of color component lights. Thus, cost of the projection display apparatus is increased as a whole.

SUMMARY OF THE INVENTION

In an aspect of the present invention, an illumination apparatus uses a fourth color component light in addition to first to third color component lights, the fourth color component light having a waveband between wavebands of the first and second color component lights. The illumination apparatus includes: a first color separator (a dichroic mirror 71) configured to separate the third color component light from a combined light including the first, second and fourth color component lights; a second color separator (a dichroic mirror 72 or a PBS cube 73) configured to separate the combined light, which is separated by the first color separator, into the first color component light and the second color component light; and a first polarization adjuster (a polarization adjuster 31Ye) provided on an optical path of the combined light between the first and second color separators. The first polarization adjuster adjusts a polarization direction of the fourth color component light in the combined light, and the second color separator separates the combined light into the first color component light on which a part of or all of the fourth color component light is superimposed and the second color component light on which the rest of the fourth color component light is superimposed.

According to the aspect described above, the second color separator separates the combined light into the first color component light on which a part of or all of the fourth color component light is superimposed and the second color component light on which the rest of the fourth color component light is superimposed. Therefore, even if four kinds or more of color component lights are utilized, a back-focus of a projection lens unit is not increased. Specifically, it is possible to divert a projection lens unit used in a projection display apparatus which utilizes three kinds of color component lights. Thus, an increase in cost for the entire apparatus can be suppressed.

Moreover, the first polarization adjuster controls the fourth color component light superimposed on the first color component light by the second color separator (in other words, the fourth color component light superimposed on the second color component light) by adjusting the polarization direction of the fourth color component light in the combined light separated by the first color separator. Thus, even if high color purity is required in the first or second color, the fourth color component light can be effectively used as illumination light while maintaining the first or second color purity.

In the aspect of the present invention described above, the illumination apparatus further includes a second polarization adjuster (a polarization adjuster 32Ye) provided on an optical path of the first or second color component light separated by the second color separator, and that the second polarization adjuster should adjust the polarization direction of the fourth color component light superimposed on the first or second color component light. Thus, it is possible to prevent colors reproduced by the first to third color component lights from being shifted toward the fourth color by the use of the fourth color component light.

In the aspect of the present invention described above, the illumination apparatus farther includes a narrow-band retarder (a narrow band retarder 40) provided on an optical path of the first or second color component light separated by the second color separator. The narrow-band retarder, when provided on the optical path of the first color component light, should align a polarization direction of the first color component light and the polarization direction of the fourth color component light superimposed on the first color component light. The narrow-band retarder, when provided on the optical path of the second color component light, should align a polarization direction of the second color component light and the polarization direction of the fourth color component light superimposed on the second color component light.

In the aspect of the present invention described above, the first polarization adjuster is configured to switch whether or not to adjust the polarization direction of the fourth color component light by 90°

In the aspect of the present invention described above, the first polarization adjuster adjust the polarization direction of the fourth color component light within a range of 0° to 90°.

In the aspect of the present invention described above, the illumination apparatus further includes a controller (a controller 300) configured to control an adjustment amount of the polarization direction of the fourth color component light adjusted by the first polarization adjuster, according to image input signals used for controlling modulation amounts of the first to third color component lights.

In the aspect of the present invention described above, the illumination apparatus further includes a first imager configured to modulate the first color component light, a second imager configured to modulate the second color component light and a third imager configured to modulate the third color component light, and that a resolution of the first polarization adjuster is lower than those of the first to third imagers.

In an aspect of the present invention, a projection display apparatus includes a first imager configured to modulate a first color component light, a second imager configured to modulate a second color component light and a third imager configured to modulate a third color component light, and uses a fourth color component light in addition to the first to third color component lights, the fourth color component light having a waveband between wavebands of the first and second color component lights. The projection display apparatus includes: a first color separator configured to separate the third color component light from a combined light including the first, second and fourth color component lights; a second color separator configured to separate the combined light, which is separated by the first color separator, into the first color component light and the second color component light; a first polarization adjuster provided on an optical path of the combined light between the first and second color separators; and a projection lens unit configured to project color component lights emitted from the first to third imagers. In the projection display apparatus, the first polarization adjuster adjusts a polarization direction of the fourth color component light in the combined light, and the second color separator separates the combined light into the first color component light on which a part of or all of the fourth color component light is superimposed and the second color component light on which the rest of the fourth color component light is superimposed.

DETAILED DESCRIPTION OF THE EMBODIMENTS

Figure 1:
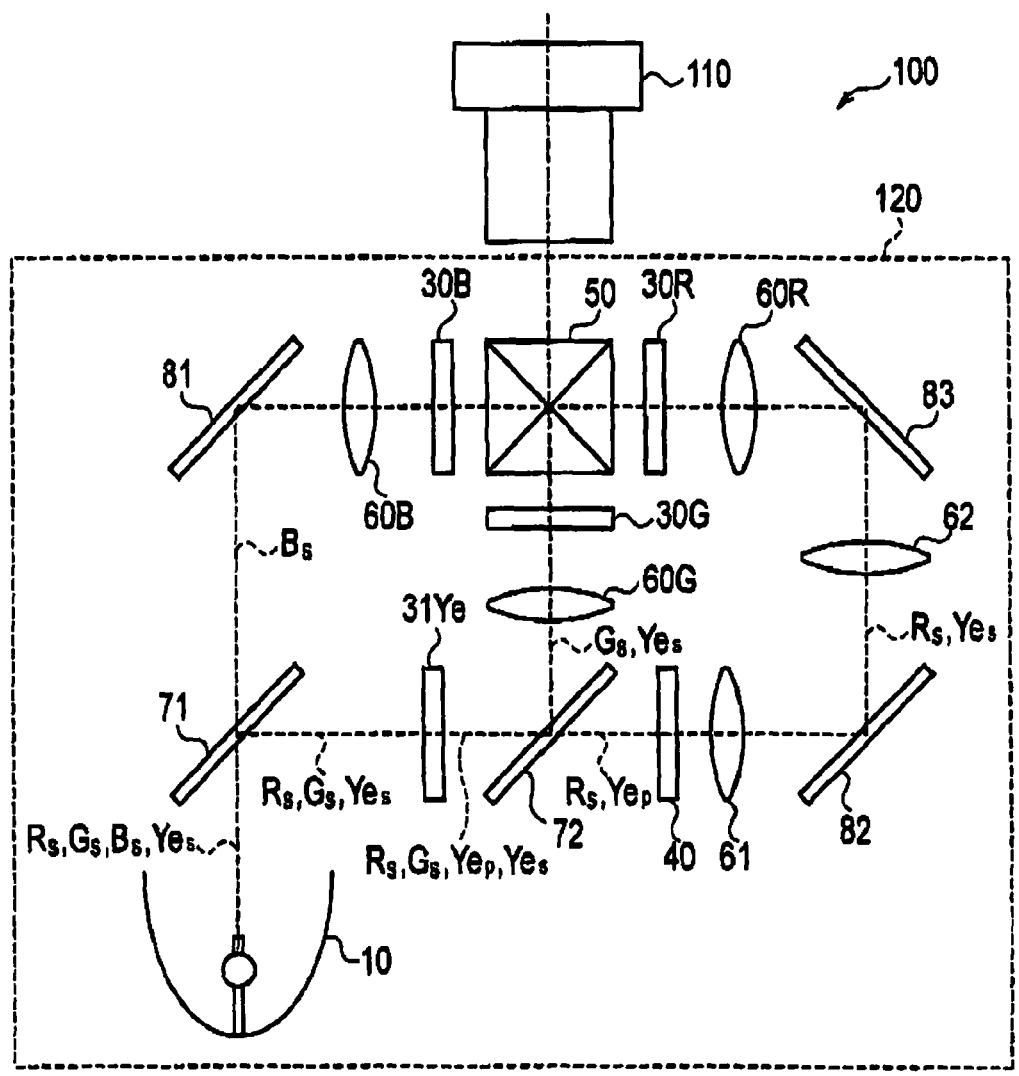
FIG. 1 is a view showing a configuration of a projection display apparatus 100 according to a first embodiment.

With reference to the drawings, a projection display apparatus according to an embodiment of the present invention will be described below. Note that, in the following description of the drawings, the same or similar parts will be denoted by the same or similar reference numerals.

However, it should be noted that the drawings are conceptual and ratios of respective dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment (Configuration of Projection Display Apparatus)

With reference to the drawings, a configuration of a projection display apparatus according to a first embodiment will be described below. FIG. 1 is a view showing a configuration of a projection display apparatus 100 according to the first embodiment.

As shown in FIG. 1, the projection display apparatus 100 has a projection lens unit 110 and an illumination apparatus 120. As described later, the projection display apparatus 100 utilizes a yellow component light Ye in addition to a red component light R, a green component light G and a blue component light B.

In the first embodiment, the red component light R is a first color component light, the green component light G is a second color component light and the blue component light B is a third color component light. The yellow component light Ye is a fourth color component light having a waveband between a waveband of the first color component light and a waveband of the second color component light.

It should be noted that, in FIG. 1, a fly-eye lens unit which uniformizes light emitted by a light source 10, a PBS (Polarized Beam Splitter) which aligns a polarization direction of the light emitted by the light source 10, and the like are omitted. The first embodiment will be described on the assumption that the polarization direction of the light emitted by the light source 10 is aligned with a direction of S-polarization in a section between a dichroic mirror 71 to be described later and the light source 10.

The projection lens unit 110 projects an image light emitted from the illumination apparatus 120 onto a screen (not shown) or the like.

The illumination apparatus 120 includes the light source 10, a plurality of liquid crystal panels 30 (a liquid crystal panel 30R, a liquid crystal panel 30G and a liquid crystal panel 30B), a polarization adjuster 31Ye, a narrow-band retarder 40 and a cross dichroic prism 50.

The light source 10 is a UHP lamp which emits white light, or the like. Specifically, the light emitted by the light source 10 includes at least the red component light R, the green component light G, the blue component light B and the yellow component light Ye.

The liquid crystal panel 30R modulates the red component light R according to an image input signal (a red input signal R). Similarly, the liquid crystal panel 30G and the liquid crystal panel 30B modulate the green component light G and the blue component light B according to image input signals (a green input signal G and a blue input signal B), respectively.

The polarization adjuster 31Ye is provided on an optical path of a combined light (the red component light R, the green component light G and the yellow component light Ye), which is separated by the dichroic mirror 71, between the dichroic mirror 71 and a dichroic mirror 72. The polarization adjuster 31Ye adjusts a polarization direction of the yellow component light Ye in the combined light separated by the dichroic mirror 71 according to a superimposition amount distribution signal Ye calculated based on the image input signals (the red input signal R, the green input signal G and the blue input signal B).

Here, the polarization adjuster 31Ye is an optical element configured to selectively to switch whether or not to adjust (rotate) the polarization direction of the yellow component light Ye by 90°. Note that the polarization adjuster 31Ye may be an optical element which adjusts the polarization direction of the yellow component light Ye within a range of 0° to 90°. The polarization adjuster 31Ye will be described in detail later (see FIGS. 3 and 4).

The narrow-band retarder 40 is provided on an optical path of the red component light R (which may include the yellow component light Ye) which is separated by the dichroic mirror 72. The narrow-band retarder 40 is an optical element which aligns a polarization direction of the red component light R and the polarization direction of the yellow component light Ye. To be more specific, the narrow-band retarder 40 aligns the polarization direction of the yellow component light Ye and the polarization direction (S-polarization) of the red component light R by adjusting the polarization direction of only the yellow component light Ye by 90°.

The cross dichroic prism 50 is a color combiner configured to combine lights emitted from the liquid crystal panels 30R, 30G and 30B. The light combined by the cross dichroic prism 50 is guided to the projection lens unit 110.

Here, the light emitted from the liquid crystal panel 30R may include not only the red component light R but also the yellow component light Ye. Similarly, the light emitted from the liquid crystal panel 30G may include not only the green component light G but also the yellow component light Ye.

The illumination apparatus 120 includes a plurality of lenses (a lens 60R, a lens 60G, a lens 60B, a lens 61 and a lens 62), a plurality of dichroic mirrors (the dichroic mirrors 71 and 72) and a plurality of reflection mirrors (a reflection mirror 81, a reflection mirror 82 and a reflection mirror 83).

The lens 60R is a lens which collects the red component light R (which may include the yellow component light Ye) so as to irradiate the projection lens unit 110 with the light emitted from the liquid crystal panel 30R. Similarly, the lens 60G is a lens which collects the green component light G (which may include the yellow component light Ye) so as to irradiate the projection lens unit 110 with the light emitted from the liquid crystal panel 30G. Moreover, the lens 60B is a lens which collects the blue component light B so as to irradiate the projection lens unit 110 with the light emitted from the liquid crystal panel 30B.

The lenses 61 and 62 are lenses for adjusting an optical path length of the red component light R to optical path lengths of the green component light G, the blue component light B and the yellow component light Ye.

The dichroic mirror 71 is a first color separator configured to separate the blue component light B from the combined light including the red component light R, the green component light G and the yellow component light Ye. Specifically, the dichroic mirror 71 transmits the blue component light B therethrough while reflecting the combined light including the red component light R, the green component light G and the yellow component light Ye.

The dichroic mirror 72 is a second color separator configured to separate the combined light, which is separated by the dichroic mirror 71, into the red component light R and the green component light G. Specifically, the dichroic mirror 72 transmits the red component light R therethrough and reflects the green component light G.

Here, the dichroic mirror 72 separates the combined light into the red component light R on which a part of or all of the yellow component light Ye is superimposed and the green component light G on which the rest of the yellow component light Ye is superimposed. The rest of the yellow component light Ye is the yellow component light Ye does not superimposed on the red component light R. Note that separation of the yellow component light Ye will be described later (see FIGS. 5 and 6).

The reflection mirror 81 is a mirror which reflects the blue component light B separated by the dichroic mirror 71 and guides the blue component light B toward the liquid crystal panel 30B.

The reflection mirrors 82 and 88 are mirrors which reflect the red component light R (which may include the yellow component light Ye) separated by the dichroic mirror 72, and guide the red component light R (which may include the yellow component light Ye) toward the liquid crystal panel 30R.

(Waveband of Each Color Component Light)

Figure 2:
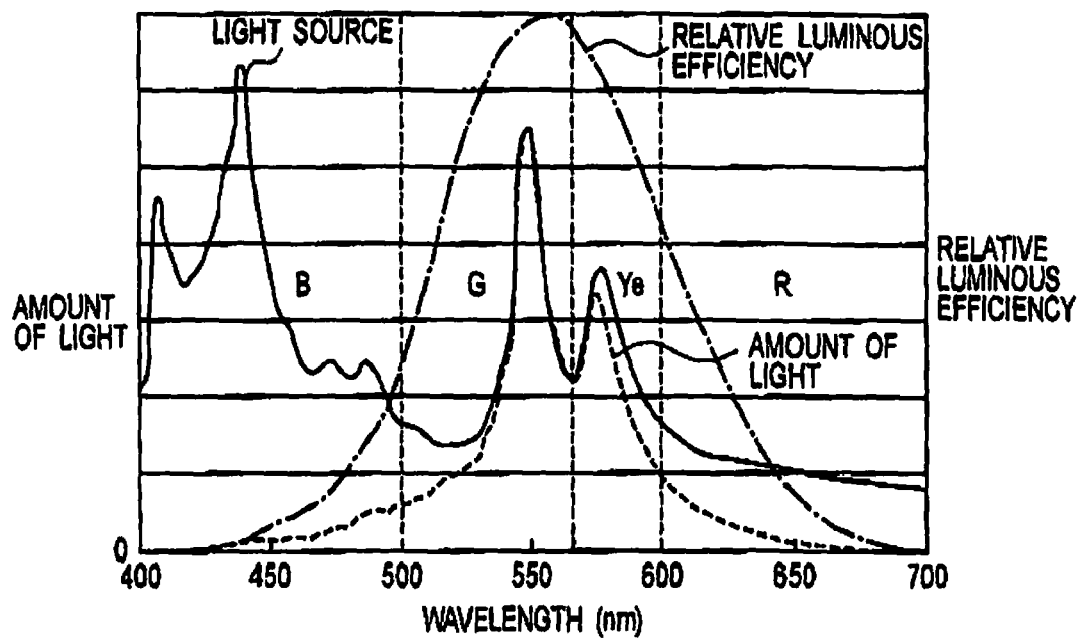
FIG. 2 is a graph showing wavebands of respective color component lights according to the first embodiment.

With reference to the drawings, description will be given below of wavebands of the respective color component lights according to the first embodiment. FIG. 2 is a graph showing the wavebands of the respective color component lights according to the first embodiment.

As shown in FIG. 2, the red component light R has a waveband with a longest wavelength in the color component lights. On the other hand, the blue component light B has a waveband with a shortest wavelength in the color component lights. The green component light G has a waveband between those of the blue component light B and the red component light R. The yellow component light Ye has a waveband between those of the green component light G and the red component light R.

Moreover, as shown in FIG. 2, an amount of the light emitted by the light source 10 has peaks in the wavebands of the green component light G and the yellow component light Ye. Relative luminous efficiency of the light emitted by the light source 10 has a peak in the waveband of the green component light G and is reduced as the wavelength is increased (or reduced) from the waveband of the green component light G.

As is clear from characteristics of the light emitted by the light source 10, the use of the yellow component light Ye in addition to the red component light R, the green component light G and the blue component light B is effective in improving luminance of an image projected onto the screen (not shown) or the like.

(Configuration of Polarization Adjuster)

Figure 4A:
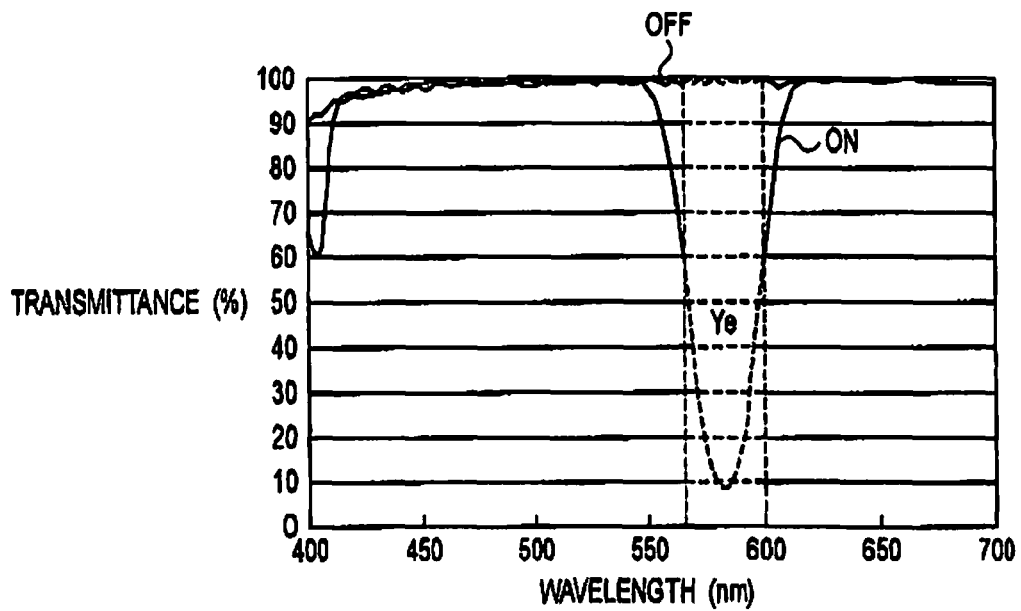
FIGS. 4A and 4B are graphs showing examples of the polarization adjuster 31Ye according to the first embodiment.
Figure 4B:
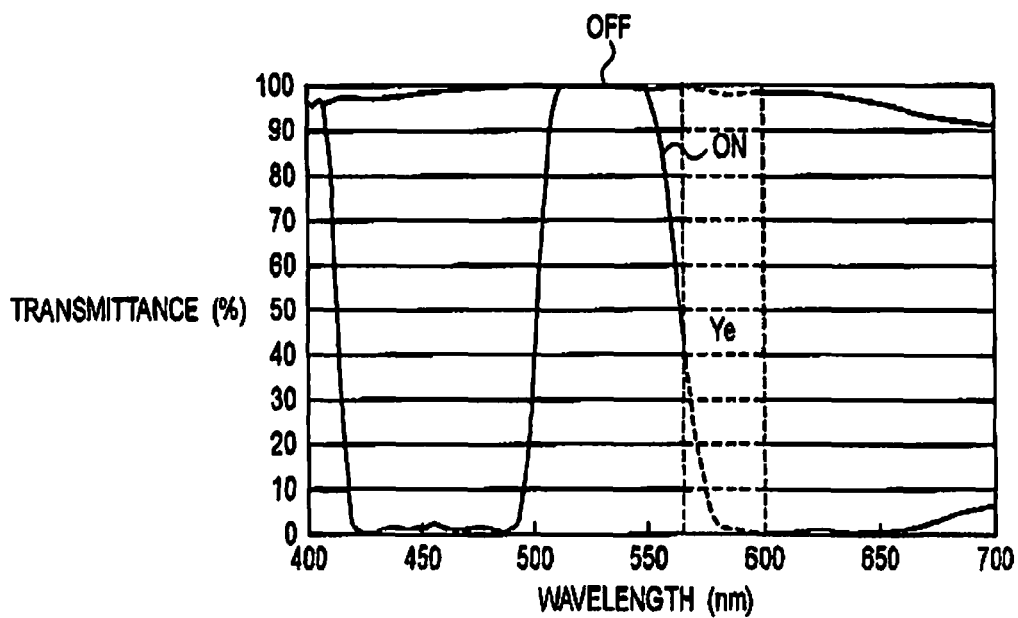
Figure 8:
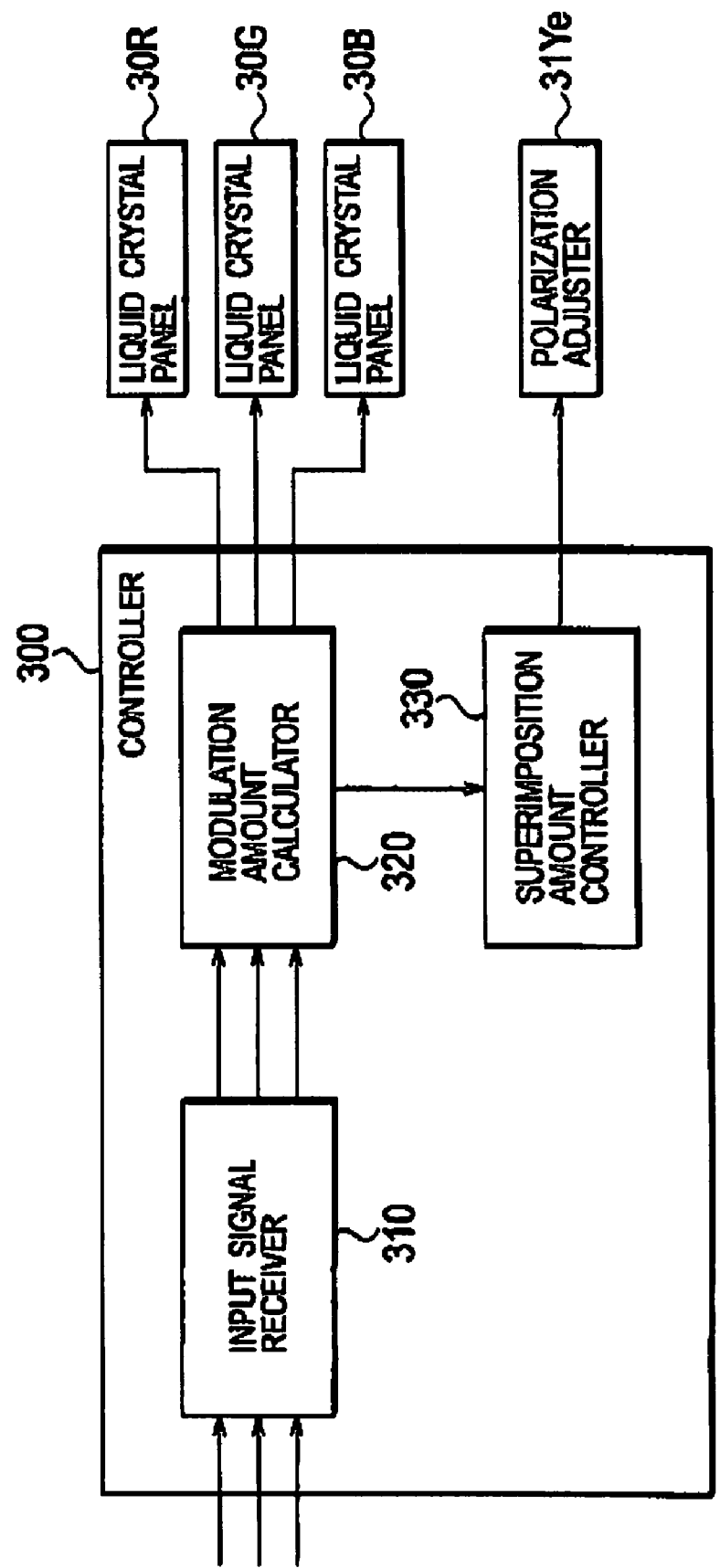
FIG. 8 is a block diagram showing a configuration of a controller 300 according to the first embodiment.

With reference to the drawings, description will be given below of a configuration of the polarization adjuster according to the first embodiment. FIG. 8 is a view for explaining the polarization adjuster 31Ye according to the first embodiment. FIGS. 4A and 4B are graphs showing examples of the polarization adjuster 31Ye according to the first embodiment.

Figure 3:
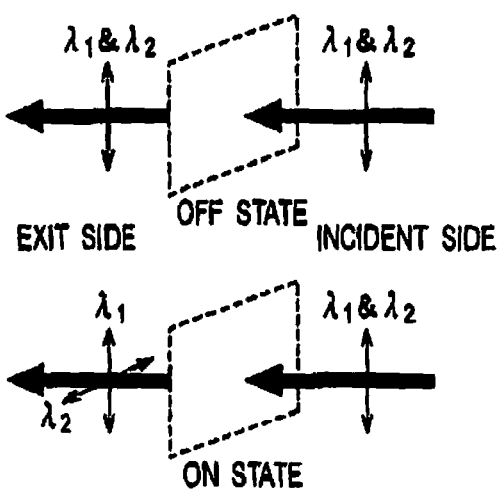
FIG. 3 is a view for explaining a polarization adjuster 31Ye according to the first embodiment.

In FIG. 3, $\lambda_1$ is the red component light R and the green component light G, and $\lambda_3$ is the yellow component light Ye. As shown in FIG. 3, in a state (OFF state) where no voltage is applied to the polarization adjuster 31Ye, polarization directions of $\lambda_1$ and $\lambda_3$ are not adjusted. On the other hand, in a state (ON state) where a voltage is applied to the polarization adjuster 31Ye, the polarization direction of $\lambda_1$ is not adjusted but the polarization direction of $\lambda_3$ is adjusted by 90°.

Here, as the polarization adjuster 31Ye, a notch filter type polarization adjuster can be used. Specifically, as shown in FIG. 4A, the notch filter type polarization adjuster 31Ye does not adjust any of the polarization directions of the respective color component lights in the state (OFF state) where no voltage is applied thereto. Meanwhile, in the state (ON state) the voltage is applied thereto, the notch filter type polarization adjuster 31Ye adjusts the polarization direction of only the yellow component light Ye and does not adjust the polarization directions of the color component lights (the red component light R and the green component light G) having the wavebands adjacent to both sides of the waveband of the yellow component light Ye.

Note that FIG. 4A shows a rate of transmission of the light through the notch filter type polarization adjuster 31Ye without adjusting the polarization directions of the respective color component lights in entering the notch filter type polarization adjuster 31Ye. In other words, FIG. 4A shows transmittance of the light when parallel polarizing plates are disposed at incident and exit sides of the polarization adjuster 31Ye. Therefore, it should be noted that, in FIG. 4A, the lower the transmittance is, the more the polarization directions of the color component lights are adjusted.

Meanwhile, as the polarization adjuster 31Ye, an edge filter type polarization adjuster can be used. Specifically, as shown in FIG. 4B, the edge filter type polarization adjuster 31Ye does not adjust any of the polarization directions of the respective color component lights in a state (OFF state) where no voltage is applied thereto. Meanwhile, in a state (ON state) where a voltage is applied thereto, the edge filter type polarization adjuster 31Ye adjusts the polarization directions of the yellow component light Ye and the color component light here, the red component light R) having a band of wavelengths longer than those of the yellow component light Ye, and does not adjust the polarization direction of the color component light (here, the green component light G) having a band of wavelengths shorter than those of the yellow component light Ye. Moreover, in the state (ON state) where the voltage is applied thereto, the edge filter type polarization adjuster 31Ye adjusts the polarization directions of the color component light (here, the blue component light B) having a band of wavelengths shorter than those of the green component light G.

Note that, as in the case of FIG. 4A, FIG. 4B shows a rate of transmission (transmittance) of the light through the edge filter type polarization adjuster 31Ye without adjusting the polarization directions of the respective color component lights in entering the edge filter type polarization adjuster 31Ye. Therefore, it should be noted that, in FIG. 4B, the lower the transmittance is, the more the polarization directions of the color component lights are adjusted.

FIG. 4B shows, for example, the edge filter type polarization adjuster 31Ye which does not adjust the polarization direction of the color component light having the band of wavelengths shorter than those of the yellow component light Ye in the state (ON state) where the voltage is applied thereto. However, the present invention is not limited thereto. Specifically, it is also possible to use an edge filter type polarization adjuster 31Ye which does not adjust the polarization direction of the color component light having a band of wavelengths longer than those of the yellow component light Ye in the state (ON state) where a voltage is applied thereto.

(Superimposition of Yellow Component Light Ye)

Figure 5:
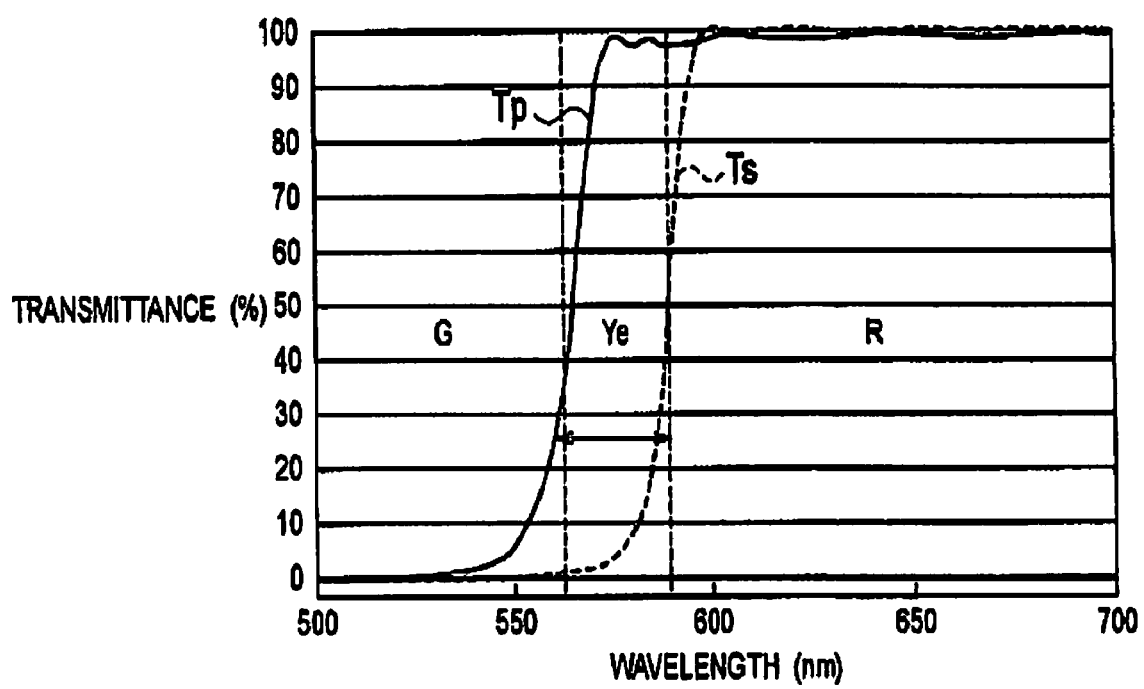
FIG. 5 is a graph for explaining superimposition of a yellow component light Ye according to the first embodiment.

With reference to the drawings, description will be given below of superimposition of the yellow component light Ye according to the first embodiment. FIGS. 5 and 6 are graphs for explaining the superimposition of the yellow component light Ye according to the first embodiment.

As shown in FIGS. 5 and 6, in the dichroic mirror 72 which separates the red component light R and the green component light G from each other, a boundary line (a cut-off wavelength) between the waveband in which the color component light is transmitted and the waveband in which the color component light is reflected differs depending on the polarization direction of the color component light. To be more specific, in the case where the polarization direction of the color component light is S-polarization direction, the cut-off wavelength is set on the long-wavelength side compared with the case where the polarization direction of the color component light is P-polarization direction.

Moreover, the dichroic mirror 72 is designed to set the waveband of the yellow component light Ye between the cut-off wavelength in the case where the polarization direction of the color component light is P-polarization direction and the cut-off wavelength in the case where the polarization direction of the color component light is S-polarization direction.

Therefore, by using the polarization adjuster 31Ye to adjust the polarization direction of the yellow component light Ye, the yellow component light Ye superimposed on the red component light R by the dichroic mirror 72 (in other words, the yellow component light Ye superimposed on the green component light G) can be controlled.

Figure 6A:
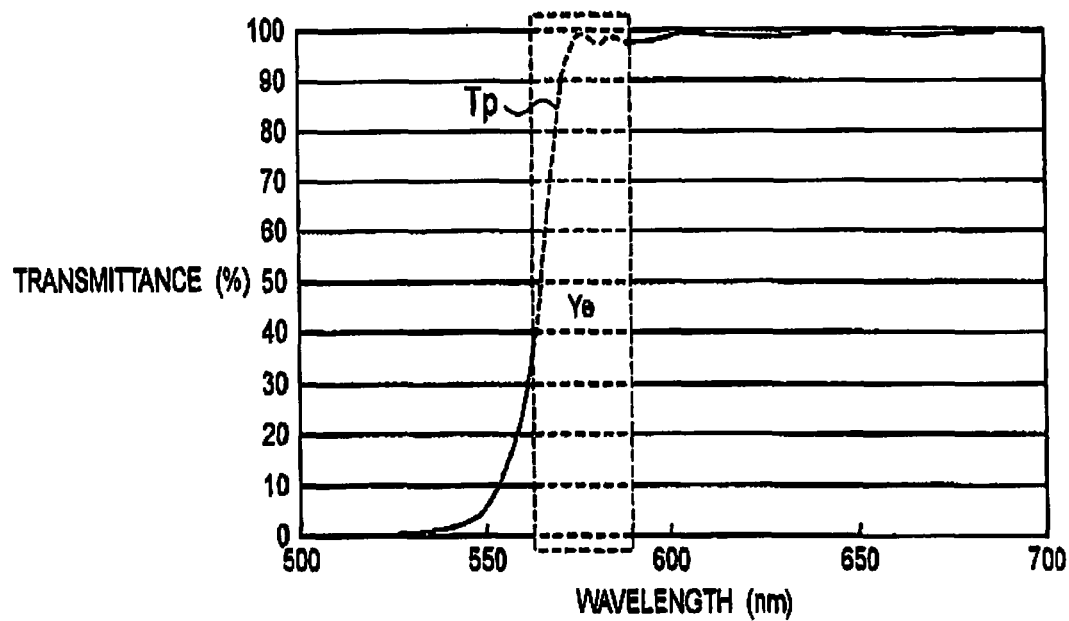
FIGS. 6A and 6B are graphs for explaining the superimposition of the yellow component light Ye according to the first embodiment.
Figure 6B:
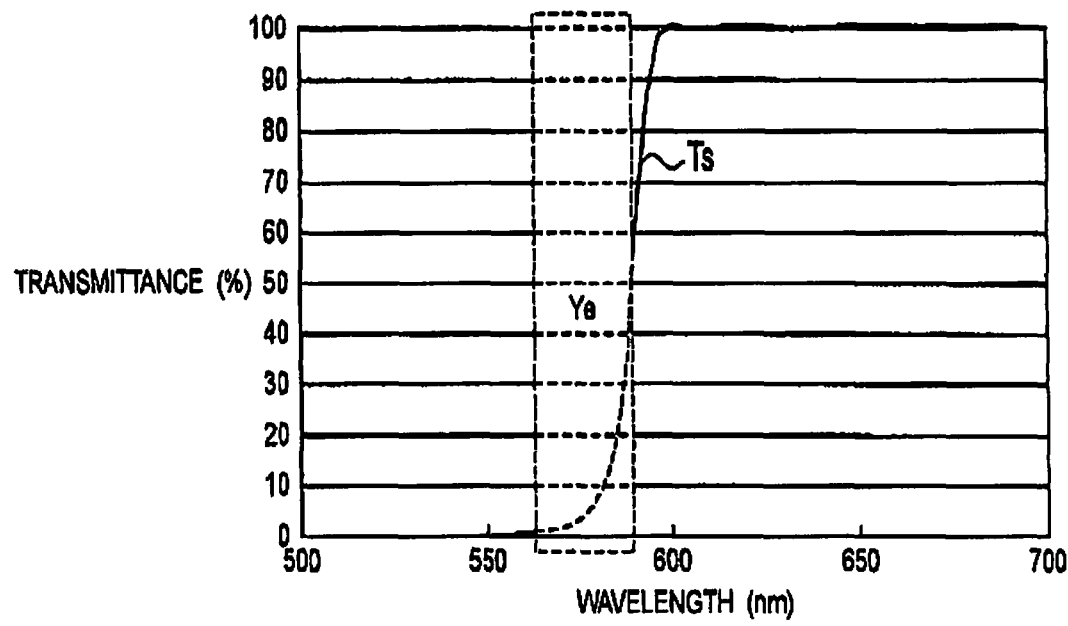

Specifically, in the case where the polarization direction of the yellow component light Ye is adjusted by the polarization adjuster 31Ye and the yellow component light Ye having the P-polarization enters the dichroic mirror 72, the dichroic mirror 72 superimposes the yellow component light Ye on the red component light R as shown in FIG. 6A. On the other hand, in the case where the polarization direction of the yellow component light Ye is not adjusted by the polarization adjuster 31Ye and the yellow component light Ye having the S-polarization enters the dichroic mirror 72, the dichroic mirror 72 superimposes the yellow component light Ye on the green component light G as shown in FIG. 6E.

(Color Reproduction Range)

Figure 7A:
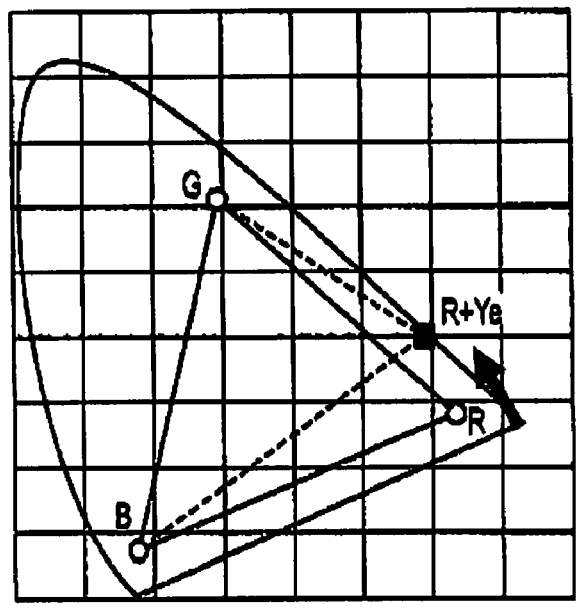
FIGS. 7A and 7B are views for explaining a color reproduction range according to the first embodiment.
Figure 7B:
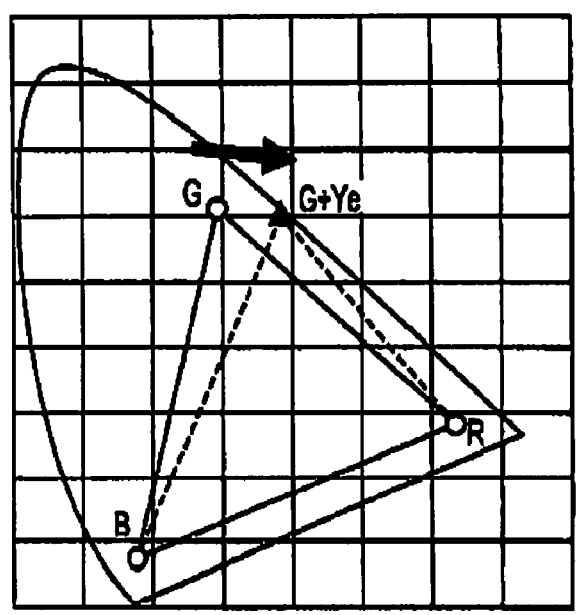

With reference to the drawings, description will be given below of a color reproduction range according to the first embodiment. FIGS. 7A and 7B are views for explaining the color reproduction range according to the first embodiment.

As shown in FIG. 7A, when the yellow component light Ye is superimposed on the red component light R, red is shifted toward yellow. Thus, a color reproduction range of red or magenta is reduced. Meanwhile, as shown in FIG. 7B, when the yellow component light Ye is superimposed on the green component light G, green is shifted toward yellow. Thus, a color reproduction range of green or cyan is reduced.

(Configuration of Controller)

With reference to the drawings, description will be given below of a configuration of a controller according to the first embodiment. FIG. 8 is a block diagram showing a configuration of a controller 300 according to the first embodiment.

As shown in FIG. 8, the controller 300 includes an input signal receiver 310, a modulation amount calculator 320 and a superimposition amount controller 330.

The input signal receiver 310 receives the image input signals including the red input signal R, the green input signal G and the blue input signal B. Specifically, the input signal receiver 810 receives image input signals from devices such as a DVD player and a TV tuner.

The modulation amount calculator 320 controls a modulation amount for each of the liquid crystal panels 30 pixel by pixel in the liquid crystal panel 30 according to the image input signal.

The superimposition amount controller 330 generates a superimposition amount distribution signal Ye for controlling the yellow component light Ye superimposed on the red component light R (in other words, the yellow component light Ye superimposed on the green component light G) based on the image input signal.

For example, the superimposition amount controller 330 obtains a distribution of hues of each of pixels included in one frame based on the image input signal corresponding to one frame. When there are more red hues than green hues in one frame as a whole, the superimposition amount controller 330 generates a superimposition amount distribution signal Ye for superimposing the yellow component light Ye not on the red component light R but on the green component light G, in order to prevent red from being shifted toward yellow. Meanwhile, when there are more green hues than red hues in one frame as a whole, the superimposition amount controller 330 generates a superimposition amount distribution signal Ye for superimposing the yellow component light Ye not on the green component light G but on the red component light R, in order to prevent green from being shifted toward yellow.

In the case of superimposing the yellow component light Ye on the green component light G, the superimposition amount controller 330 outputs to the polarization adjuster 31Ye a superimposition amount distribution signal Ye for not adjusting the polarization direction of the yellow component light Ye. Meanwhile, in the case of superimposing the yellow component light Ye on the red component light R, the superimposition amount controller 330 outputs to the polarization adjuster 31Ye a superimposition amount distribution signal Ye for adjusting the polarization direction of the yellow component light Ye by 90°.

(Operations and Effects)

In the projection display apparatus 100 according to the first embodiment, the dichroic mirror 72 separates the combined light into the red component light R on which a part of or all of the yellow component light Ye is superimposed and the green component light G on which the rest of the yellow component light Ye is superimposed. Therefore, even when four kinds or more of color component lights are used, a back-focus of the projection lens unit 110 is not increased. Specifically, it is possible to divert the projection lens unit 110 used in the projection display apparatus 100 which utilizes three kinds of color component lights. Thus, an increase in cost for the entire apparatus can be suppressed.

Moreover, the polarization adjuster 31Ye adjusts the polarization direction of the yellow component light Ye in the combined light separated by the dichroic mirror 71, thereby controlling the yellow component light Ye superimposed on the red component light R by the dichroic mirror 72 (in other words, the yellow component light Ye superimposed on the green component light G). Thus, even if high color purity is required in red or green, the yellow component light Ye can be effectively used as illumination light while maintaining red or green color purity.

Second Embodiment

With reference to the drawings, a second embodiment will be described below. The following description will be mainly given of differences between the first embodiment described above and the second embodiment.

In the first embodiment described above, the polarization adjuster 31Ye is configured to selectively to switch whether or not to adjust the polarization direction of the yellow component light Ye by 90°.

On the other hand, in the second embodiment, the polarization adjuster 31Ye is configured to adjust the polarization direction of the yellow component light Ye within a range of 0° to 90°. Between the dichroic mirror 72 and the liquid crystal panel 30G, provided is a second polarization adjuster configured to adjust the polarization direction of the yellow component light Ye within a range of 0° to 90°.

Note that, when the polarization direction of the yellow component light Ye is adjusted within a range of 0° to 90°, a proportion of the yellow component light Ye with the S-polarization to the yellow component light Ye with the P-polarization is adjusted. For example, when the yellow component light Ye with the S-polarization is not adjusted, the proportion of the yellow component light Ye with the S-polarization is set to 100%. Meanwhile, when the yellow component light Ye with the S-polarization is adjusted by 90°, the proportion of the yellow component light Ye with the P-polarization is set to 100%. Moreover, when the yellow component light Ye with the S-polarization is adjusted by 45°, the proportion of the yellow component light Ye with the S-polarization is set to 50% and the proportion of the yellow component light Ye with the P-polarization is set to 50%.

(Configuration of Projection Display Apparatus)

Figure 9:
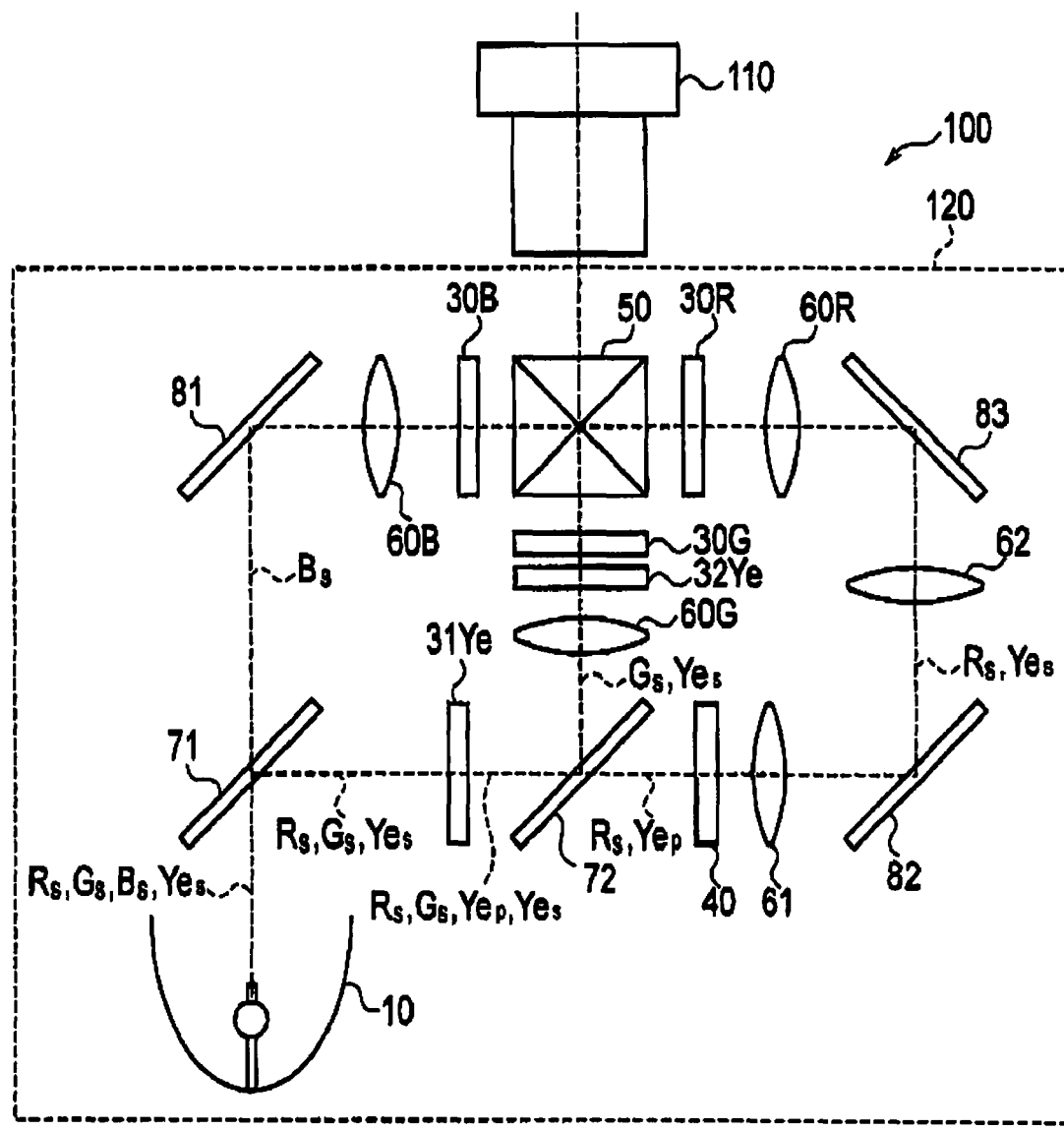
FIG. 9 is a view showing a configuration of a projection display apparatus 100 according to a second embodiment.

With reference to the drawings, a configuration of a projection display apparatus according to the second embodiment will be described below. FIG. 9 is a view showing a configuration of a projection display apparatus 100 according to the second embodiment. It should be noted that, in FIG. 9, the same parts as those shown in FIG. 1 are denoted by the same reference numerals.

As shown in FIG. 9, an illumination apparatus 120 has a polarization adjuster 32Ye in addition to those shown in FIG. 1.

The polarization adjuster 31Ye described above adjusts the polarization direction of the yellow component light Ye in the combined light separated by the dichroic mirror 71 according to a superimposition amount distribution signal $Ye_1$ calculated based on image input signals (a red input signal R, a green input signal G and a blue input signal B).

The polarization adjuster 32Ye is provided on an optical path of the green component light G (which may include the yellow component light Ye), which is separated by the dichroic mirror 72, between the dichroic mirror 72 and the liquid crystal panel 30G. The polarization adjuster 32Ye adjusts the polarization direction of the yellow component light Ye in the combined light separated by the dichroic mirror 72 within a range of 0° to 90° according to a superimposition amount distribution signal $Ye_2$ calculated based on the image input signals (the red input signal R, the green input signal G and the blue input signal B).

Here, when the polarization direction of the yellow component light Ye is adjusted by the polarization adjuster 32Ye, the polarization direction of the yellow component light Ye is set to the polarization direction (P-polarization) different from the polarization direction (S-polarization) of the green component light G. Therefore, the yellow component light Ye having the polarization direction adjusted by the polarization adjuster 32Ye is not transmitted through a polarizing plate provided on an incident surface side of the liquid crystal panel 30G. Thus, the yellow component light Ye to be superimposed on the green component light G emitted from the liquid crystal peel 30G is controlled.

(Configuration of Controller)

Figure 10:
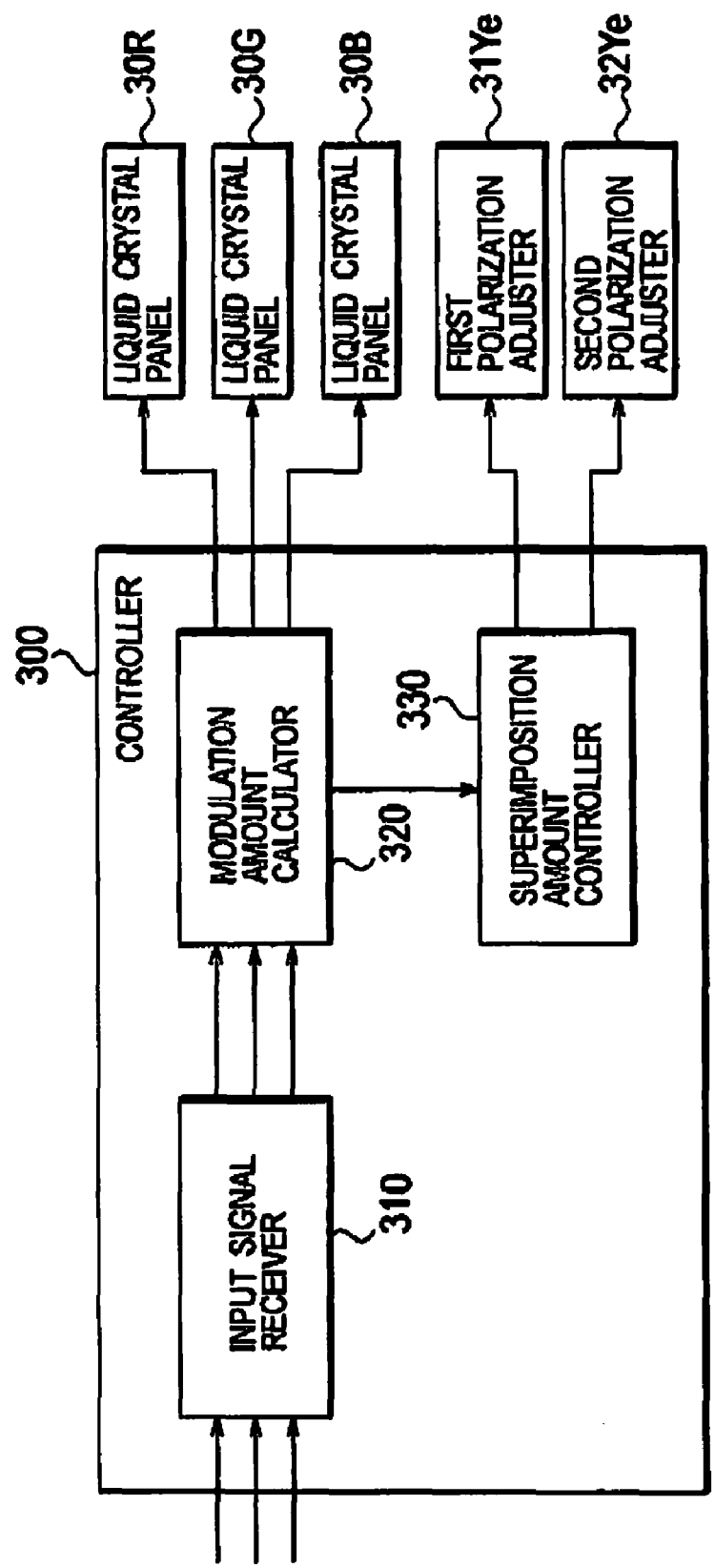
FIG. 10 is a block diagram showing a configuration of a controller 300 according to the second embodiment.

With reference to the drawings, description will be given below of a configuration of a controller according to the second embodiment. FIG. 10 is a block diagram showing a configuration of a controller 300 according to the second embodiment. Note that the same parts as those shown in FIG. 8 are denoted by the same reference numerals in FIG. 10.

As shown in FIG. 10, the controller 300 is connected to the polarization adjuster 32Ye in addition to the respective liquid crystal panels 30 and the polarization adjuster 31Ye.

A superimposition amount controller 330 generates a superimposition amount distribution signal $Ye_1$ for controlling the polarization adjuster 31Ye and a superimposition amount distribution signal $Ye_2$ for controlling the polarization adjuster 32Ye.

The superimposition amount distribution signal $Ye_1$ is a control signal for controlling the yellow component light Ye superimposed on the red component light R. Meanwhile, the superimposition amount distribution signal $Ye_2$ is a control signal for controlling the yellow component light Ye superimposed on the green component light G.

For example, the superimposition amount controller 380 generates the superimposition amount distribution signal $Ye_1$ and the superimposition amount distribution signal $Ye_2$ according to hues and saturations of pixels included in one frame based on the image input signal corresponding to one frame.

To be more specific, the superimposition amount controller 330 generates the superimposition amount distribution signal $Ye_2$ for controlling the yellow component light Ye superimposed on the green component light G after generating the superimposition amount distribution signal $Ye_1$ for controlling the yellow component light Ye superimposed on the red component light R.

A superimposition amount (Q_R) of the yellow component light Ye superimposed on the red component light R is calculated, for example, by the following expression (1).

[Expression 1]

$$Q\_R = \sum_{v}^{v_{total}} \sum_{h}^{H_{total}} \{(HUE\_[h, v] - HUE\_R) \times (1 - SAT[h, v])\}$$

Expression (1)

h ... horizontal pixel position
v ... vertical pixel position
HUE_[h, v] ... hue of each pixel
HUE_R ... fixed value
SAT[h, v] ... saturation of each pixel, $0 \leq SAT[h, v] \leq 1$ The superimposition amount controller 330 determines an adjustment rate (adjustment amount) of the polarization direction of the yellow component light Ye adjusted by the polarization adjuster 31Ye, according to the superimposition amount (Q_R) of the yellow component light Ye superimposed on the red component light R. Specifically, the adjustment rate ($C_1$) of the polarization direction of the yellow component light Ye adjusted by the polarization adjuster 31Ye, is calculated by the following expression (2).

[Expression 2]

$$C_1 = Q\_R/Q\_MAX$$

Expression (2)

Q_MAX ... maximum superimposition amount of yellow component light Ye

Accordingly, the superimposition amount controller 330 generates the superimposition amount distribution signal $Ye_1$ indicating the adjustment rate ($C_1$).

Meanwhile, a superimposition amount (Q_G) of the yellow component light Ye superimposed on the green component light G is calculated, for example, by the following expression (3).

[Expression 3]

$$Q\_G = \sum_{v}^{v_{total}} \sum_{h}^{H_{total}} \{(HUE\_[h, v] - HUE\_G) \times (1 - SAT[h, v])\}$$

Expression (3)

h ... horizontal pixel position
v ... vertical pixel position
HUE_[h, v] ... hue of each pixel
HUE_G ... fixed value
SAT[h, v] ... saturation of each pixel, $0 \leq SAT[h, v] \leq 1$ The superimposition amount controller 330 determines an adjustment rate (adjustment amount) of the polarization direction of the yellow component light Ye adjusted by the polarization adjuster 32Ye, according to the superimposition amount (Q_G) of the yellow component light Ye superimposed on the green component light G. Specifically, the adjustment rate ($C_2$), at which the yellow component light Ye is adjusted by the polarization adjuster 32Ye, is calculated by the following expression (4).

[Expression 4]

$$C_3 = Q\_G/(Q\_MAX - Q\_R)$$

Expression (4)

Accordingly, the superimposition amount controller 330 generates the superimposition amount distribution signal $Ye_2$ indicating the adjustment rate ($C_2$).

Here, the yellow component light Ye guided by the polarization adjuster 32Ye is a part of the yellow component light Ye emitted by the light source 10, the part being not superimposed on the red component light R. Therefore, it should be noted that the yellow component light Ye (Q_R) superimposed on the red component light R is taken into consideration for calculation of the adjustment rate ($C_2$).

Figures 11, 12:
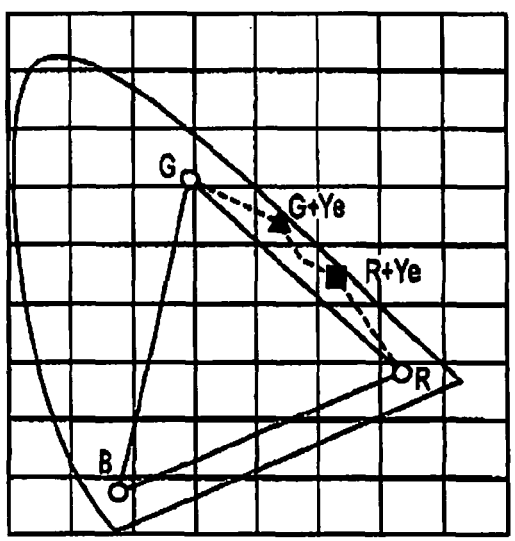
FIG. 11 is a table showing an example of superimposition control for a yellow component light Ye according to the second embodiment.
FIG. 12 is a view showing a color reproduction range according to the second embodiment.

With reference to FIG. 11, description will be given below of an example of the yellow component light Ye that reaches the liquid crystal panels 30R and 30G, focused on a relationship between the adjustment rate ($C_1$) of the polarization adjuster 31Ye and the adjustment rate ($C_2$) of the polarization adjuster 32Ye. In FIG. 11, the respective color component lights that reach the liquid crystal panels 30R and 30G are indicated by index numbers when the maximum amount of each of the color component lights is set to 100.

As shown in FIG. 11, provision of the polarization adjuster 32Ye in addition to the polarization adjuster 31Ye increases a degree of freedom of distribution of the superimposition amount of the yellow component light Ye. Specifically, in the first embodiment described above, yellow component light Ye emitted by the light source 10 is always superimposed on the red component light R or the green component light G. On the other hand, in the second embodiment, the provision of the polarization adjuster 32Ye makes it possible to properly control the yellow component light Ye superimposed on the red component light R and the yellow component light Ye superimposed on the green component light G. Moreover, in the second embodiment, it is also possible not to use the yellow component light Ye if necessary.

As described above, by increasing the degree of freedom of distribution of the superimposition amount of the yellow component light Ye, a color reproduction range of the illumination apparatus 120 is extended as shown in FIG. 12.

(Operations and Effects)

In the projection display apparatus 100 according to the second embodiment, the polarization direction of the yellow component light Ye is adjusted within the range of 0° to 90° by the polarization adjuster 31Ye. The polarization adjuster 32Ye is provided between the dichroic mirror 72 and the liquid crystal panel 30G. The polarization adjuster 32Ye adjusts the polarization direction of the yellow component light Ye within the range of 0° to 90°.

Therefore, the yellow component light Ye superimposed on the red component light R and the yellow component light Ye superimposed on the green component light G are properly controlled. Thus, it is possible to effectively prevent colors reproduced by the red component light R, the green component light G and the blue component light B from being shifted toward yellow by the use of the yellow component light Ye.

Third Embodiment

With reference to the drawings, a third embodiment will be described below. The following description will be mainly given of differences between the second embodiment described above and the third embodiment.

Specifically, in the second embodiment described above, the dichroic mirror 72 is used as a second color separator configured to separate the red component light B and the green component light G from each other.

Meanwhile, in the third embodiment, a PBS cube is used as a second color separator configured to separate the red component light R and the green component light G from each other.

(Configuration of Projection Display Apparatus)

Figure 13:
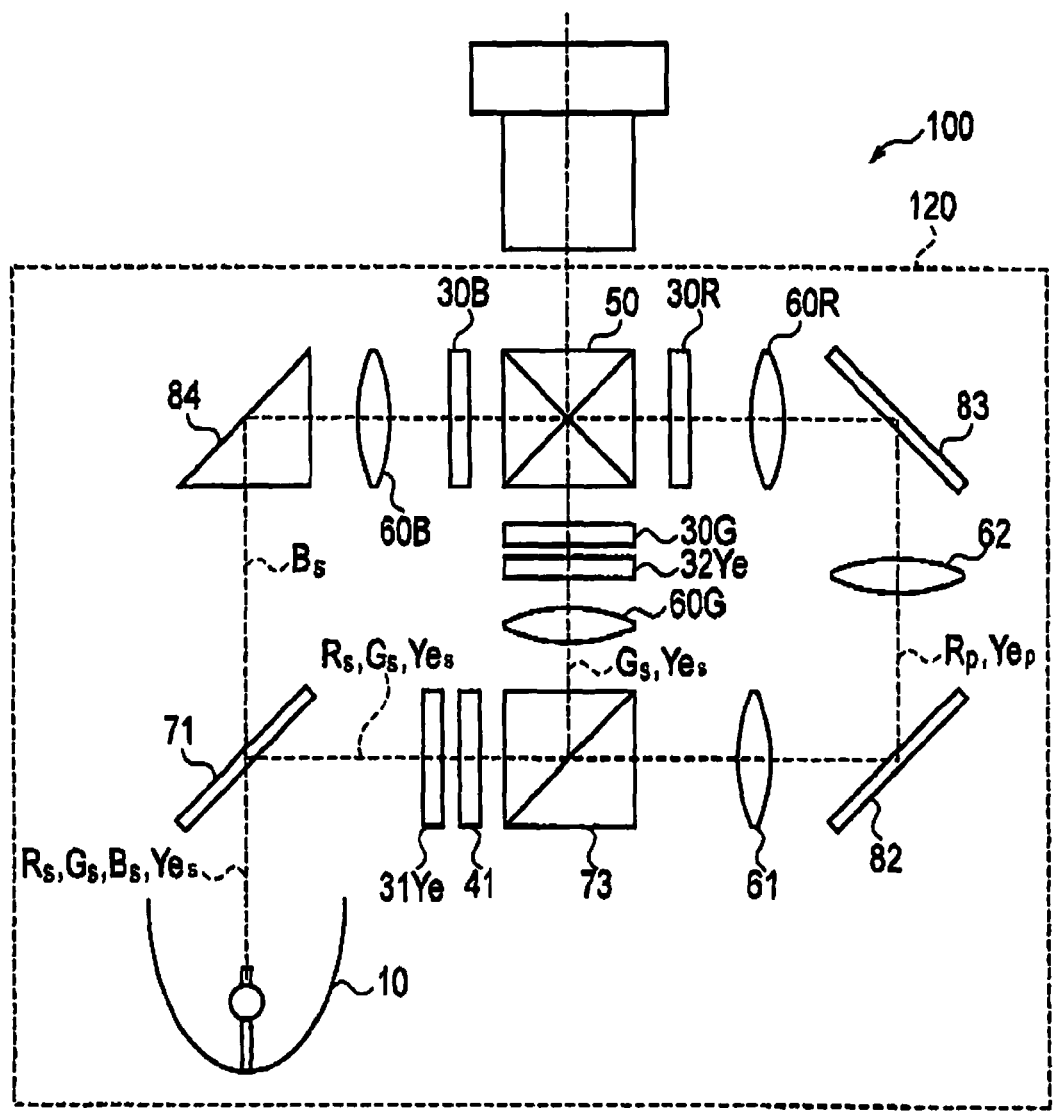
FIG. 13 is a view showing a configuration of a projection display apparatus 100 according to a third embodiment.

With reference to the drawings, a configuration of a projection display apparatus according to the third embodiment will be described below. FIG. 13 is a view showing a configuration of a projection display apparatus 100 according to the third embodiment. Note that the same parts as those shown in FIG. 9 are denoted by the same reference numerals in FIG. 13.

As shown in FIG. 13, an illumination apparatus 120 includes a narrow-band retarder 41, a PBS cube 73 and a triangular prism mirror 84, instead of the narrow-band retarder 40, the dichroic mirror 72 and the reflection mirror 81.

The narrow-band retarder 41 is provided on an optical path of combined light, which is separated by a dichroic mirror 71, between a polarization adjuster 31Ye and the PBS cube 73. The narrow-band retarder 41 is an optical element which adjusts a polarization direction of only a red component light R by 90° so as to transmit the red component light R through the PBS cube 73.

Here, it should be noted that the narrow-band retarder 41 has a function of aligning the polarization direction of the red component light R with a polarization direction (P-polarization) of a yellow component light Ye having its polarization direction adjusted by the polarization adjuster 31Ye.

The PBS cube 73 is an optical element which transmits the P-polarization color component light therethrough and reflects an S-polarization color component light. Specifically, the PBS cube 73 transmits therethrough the P-polarization red component light R having the polarization direction adjusted by the narrow-band retarder 41 and the P-polarization yellow component light Ye having the polarization direction adjusted by the polarization adjuster 31Ye. Meanwhile, the PBS cube 73 reflects S-polarization green component light G and yellow component light Ye of which polarization directions are not adjusted.

The triangular prism mirror 84 is an optical element which is formed of the same material as that of the PBS cube 73, reflects a blue component light B, and guides the blue component light B toward a liquid crystal panel 30B.

Here, the use of the PBS cube 73 makes an optical path length of the blue component light B different from those of the red component light R, the green component light G and the yellow component light Ye. Therefore, by using the triangular prism mirror 84 instead of the reflection mirror 81, the optical path length of the blue component light B is adjusted to those of the red component light R, the green component light G and the yellow component light Ye.

(Operations and Effects)

The projection display apparatus 100 (the illumination apparatus 120) according to the third embodiment can achieve the same effects as those of the second embodiment, even if the configuration of the illumination apparatus 120 is different from that in the second embodiment.

Other Embodiments

The present invention has been described through the embodiments described above. However, it should be understood that the present invention is not limited to the description and drawings both of which constitute a part of this disclosure. From this disclosure, various alternative embodiments, examples and operational techniques will become apparent to those skilled in the art.

For example, in the embodiments described above, the polarization directions of the respective color component lights emitted by the light source 10 are aligned with the S-polarization direction in the section between the dichroic mirror 71 and the light source 10. However, the present invention is not limited thereto. Specifically, the polarization directions of the respective color component lights emitted by the light source 10 may be aligned with the P-polarization direction in the section between the dichroic mirror 71 and the light source 10. In this case, as a matter of course, the functions of the respective optical elements provided in the illumination apparatus 120 are accordingly changed.

The embodiments have been described on the assumption that the polarization adjusters 31Ye and 32Ye have no resolutions. However, the present invention is not limited thereto. The polarization adjusters 31Ye and 32Ye may be divided into a plurality of regions and configured to control an adjustment rate of the yellow component light Ye for each of the plurality of regions. Specifically, the polarization adjusters 31Ye and 32Ye may have the resolutions.

In the case where the polarization adjusters 31Ye and 32Ye have the resolutions as described above, the resolutions thereof are preferably lower than those of the respective liquid crystal panels 30. Thus, it is possible to prevent utilization efficiency of the yellow component light Ye used as illumination light from being lowered by electrodes and the like provided in the polarization adjusters 31Ye and 32Ye.

As a matter of course, the adjustment rate of the yellow component light Ye, which is controlled for each of the plurality of regions, is calculated based on an image input signal corresponding to each of the plurality of regions.

In the embodiments described above, the polarization adjuster 32Ye is provided on the optical path of the green component light G separated by the dichroic mirror 72 (or the PBS cube 73). However, the present invention is not limited thereto. Specifically, the polarization adjuster 32Ye may be provided on the optical path of the red component light R separated by the dichroic mirror 72 (or the PBS cube 73). In this case, the adjustment rate ($C_1$) of the yellow component light Ye, at which the yellow component light Ye is adjusted by the polarization adjuster 31Ye, is calculated based on the fixed value (HUE_G) corresponding to green (the above expressions (3) and (4)). Meanwhile, the adjustment rate ($C_2$) of the yellow component light Ye, at which the yellow component light Ye is adjusted by the polarization adjuster 32Ye, is calculated based on the fixed value (HUE_R) corresponding to red (the above expressions (1) and (2)).

In the embodiments described above, the yellow component light Ye having the waveband between the wavebands of the red component light R and the green component light G is used as the fourth color component light. However, the present invention is not limited thereto. Specifically, a cyan light component Cy having a waveband between the wavebands of the blue component light B and the green component light G may be used as the fourth color component light.

What is claimed is:

1. An illumination apparatus which uses a fourth color component light in addition to a first color component light, a second color component light, and a third color component light, the fourth color component light having a waveband between wavebands of the first color component light and second color component light, comprising:

a first color separator configured to separate the third color component light from a combined light including the first color component light, the second color component light and the fourth color component light;

a second color separator configured to separate the combined light, which is separated by the first color separator, into the first color component light and the second color component light; and a first polarization adjuster provided on an optical path of the combined light between the first color separator and the second color separator, wherein the first polarization adjuster adjusts a polarization direction of the fourth color component light in the combined light, and the second color separator separates the combined light into the first color component light on which a part of or all of the fourth color component light is superimposed and the second color component light on which a rest of the fourth color component light is superimposed.

2. The illumination apparatus according to claim 1, further comprising:

a second polarization adjuster provided on an optical path of any one of the first color component light and the second color component light separated by the second color separator, wherein the second polarization adjuster adjusts the polarization direction of the fourth color component light superimposed on any one of the first color component light and the second color component light.

3. The illumination apparatus according to claim 1, further comprising:

a narrow-band retarder provided on an optical path of any one of the first color component light and the second color component light separated by the second color separator, wherein the narrow-band retarder, when provided on the optical path of the first color component light, aligns a polarization direction of the first color component light and the polarization direction of the fourth color component light superimposed on the first color component light, and the narrow-band retarder, when provided on the optical path of the second color component light, aligns a polarization direction of the second color component light and the polarization direction of the fourth color component light superimposed on the second color component light.

4. The illumination apparatus according to claim 1, wherein the first polarization adjuster is configured to switch whether or not to adjust the polarization direction of the fourth color component light by 90°.

5. The illumination apparatus according to claim 1, wherein the first polarization adjuster adjusts the polarization direction of the fourth color component light within a range of 0° to 90°.

6. The illumination apparatus according to claim 5, further comprising:

a controller configured to control an adjustment amount of the polarization direction of the fourth color component light adjusted by the first polarization adjuster, according to image input signals used for control of modulation amounts of the first color component light, the second color component light, and the third color component light.

7. The illumination apparatus according to claim 1, further comprising:

a first imager configured to modulate the first color component light;

a second imager configured to modulate the second color component light; and a third imager configured to modulate the third color component light, wherein a resolution of the first polarization adjuster is lower than resolutions of the first imager, the second imager, and the third imager.

8. A projection display apparatus which includes a first imager configured to modulate a first color component light, a second imager configured to modulate a second color component light and a third imager configured to modulate a third color component light, and which uses a fourth color component light in addition to the first color component light, the second color component light, and the third color component light, the fourth color component light having a waveband between wavebands of the first color component light and the second color component light, the projection display apparatus comprising:

a first color separator configured to separate the third color component light from a combined light including the first color component light, the second color component light, and the fourth color component light;

a second color separator configured to separate the combined light, which is separated by the first color separator, into the first color component light and the second color component light;

a first polarization adjuster provided on an optical path of the combined light between the first color separator and the second color separator; and a projection lens unit configured to project color component lights emitted from the first imager, the second imager and the third imager, wherein the first polarization adjuster adjusts a polarization direction of the fourth color component light in the combined light, and the second color separator separates the combined light into the first color component light on which a part of or all of the fourth color component light is superimposed and the second color component light on which a rest of the fourth color component light is superimposed.

* * * * *